(12) United States Patent
Herdendorf et al.

(10) Patent No.: US 11,348,610 B1
(45) Date of Patent: May 31, 2022

(54) MOVABLE RAMP WITH ARM ENGAGING BRACKET FOR AN ELEVATOR DRIVE ON A MAGNETIC DISC RECORDING DEVICE

(71) Applicant: Seagate Technology LLC, Fremont, CA (US)

(72) Inventors: Brett R. Herdendorf, Mound, MN (US); Riyan Alex Mendonsa, Edina, MN (US); Wolfgang Rosner, Burnsville, MN (US); Steven L. Weber, Ramsey, MN (US); Krishnan Subramanian, Shakopee, MN (US); Edward Charles Gage, Lakeville, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/163,983

(22) Filed: Feb. 1, 2021

(51) Int. Cl.
  *G11B 5/55* (2006.01)
  *G11B 5/60* (2006.01)
  *G11B 5/48* (2006.01)

(52) U.S. Cl.
  CPC .......... *G11B 5/5573* (2013.01); *G11B 5/4873* (2013.01); *G11B 5/5547* (2013.01); *G11B 5/6058* (2013.01)

(58) Field of Classification Search
  None
  See application file for complete search history.

(56) References Cited

U.S. PATENT DOCUMENTS

| | | | |
|---|---|---|---|
| 4,392,165 A | 7/1983 | Wright | |
| 4,937,692 A | 6/1990 | Okutsu | |
| 5,341,260 A * | 8/1994 | Jabbari | G11B 19/04 360/254.8 |
| 5,467,238 A | 11/1995 | Lee et al. | |
| 6,344,950 B1 | 2/2002 | Watson et al. | |
| 6,369,988 B1 | 4/2002 | Yoshida et al. | |
| 6,480,361 B1 * | 11/2002 | Patterson | G11B 5/54 360/254.3 |
| 6,549,377 B2 | 4/2003 | Yoshida et al. | |
| 7,672,083 B1 | 3/2010 | Yu et al. | |
| 8,958,172 B1 | 2/2015 | Hansen | |
| 8,958,173 B1 | 2/2015 | Hirano et al. | |
| 9,218,833 B1 | 12/2015 | Shah et al. | |
| 10,269,380 B1 | 4/2019 | Sun et al. | |
| 10,622,012 B1 | 4/2020 | Tu et al. | |
| 10,706,879 B2 | 7/2020 | Garbarino | |

(Continued)

*Primary Examiner* — Tan X Dinh
(74) *Attorney, Agent, or Firm* — Westman, Champlin & Koehler, P.A.

(57) ABSTRACT

A data storage device includes at least one data storage disc, at least one head supported by a rotatable actuator arm, an elevator configured to move the rotatable actuator arm in a z direction, a first vertical guide post, a ramp assembly configured to support the head on a movable ramp, and a bracket attached to the movable ramp. The at least one head is configured to communicate with the at least one data storage disc when positioned over the at least one data storage disc. The movable ramp is moveable in a z direction parallel to the first vertical guide post. The bracket is engageable to the rotatable actuator arm so that the bracket moves along the first vertical guide post in unison with z direction motion of the rotatable actuator arm via the elevator, and the bracket is disengageable from the rotatable actuator arm.

20 Claims, 12 Drawing Sheets

(56) References Cited

U.S. PATENT DOCUMENTS

| | | | |
|---|---|---|---|
| 10,803,891 B1* | 10/2020 | Jacoby | G11B 5/4833 |
| 11,094,347 B1* | 8/2021 | Herdendorf | G11B 21/12 |
| 2001/0033459 A1* | 10/2001 | Boutaghou | G11B 21/22 |
| | | | 360/254.3 |
| 2002/0141102 A1* | 10/2002 | Kusumoto | G11B 5/54 |
| | | | 360/75 |
| 2004/0136105 A1* | 7/2004 | Ma | G11B 5/09 |
| | | | 360/31 |
| 2005/0280945 A1 | 12/2005 | Duvall et al. | |
| 2008/0192385 A1* | 8/2008 | Choi | G11B 21/22 |
| | | | 360/256.2 |
| 2010/0309574 A1* | 12/2010 | Bahirat | G11B 5/54 |
| | | | 360/71 |
| 2011/0038074 A1 | 2/2011 | Viskochil et al. | |
| 2020/0027477 A1* | 1/2020 | Garbarino | G11B 21/12 |
| 2020/0027479 A1 | 1/2020 | Myers et al. | |
| 2020/0027480 A1 | 1/2020 | Myers et al. | |
| 2020/0202891 A1 | 6/2020 | Mendonsa et al. | |
| 2020/0227077 A1 | 7/2020 | Sukla et al. | |

* cited by examiner ment of the ramp.

MOVABLE RAMP WITH ARM ENGAGING BRACKET FOR AN ELEVATOR DRIVE ON A MAGNETIC DISC RECORDING DEVICE

SUMMARY

In one embodiment, a data storage device includes at least one data storage disc, at least one head supported by a rotatable actuator arm, an elevator configured to move the rotatable actuator arm in a z direction, a first vertical guide post, a ramp assembly configured to support the at least one head on a movable ramp when the at least one head is rotated away from the at least one data storage disc, and a bracket attached to the movable ramp. The at least one head is configured to communicate with the at least one data storage disc when positioned over the at least one data storage disc. The movable ramp is moveable in a z direction parallel to the first vertical guide post. The bracket is engageable to the rotatable actuator arm so that the bracket moves along the first vertical guide post in unison with z direction motion of the rotatable actuator arm via the elevator, and the bracket is disengageable from the rotatable actuator arm.

In another embodiment, a data storage device comprises at least one data storage medium having an outer diameter (OD), an actuator arm coupled to a load beam, a moveable ramp positioned proximate to the OD, and an elevator configured to move the actuator arm in a z direction. The load beam carries a head that is configured to interact with the at least one data storage medium. The moveable ramp is configured to support the head when the head is rotated away from the at least one data storage medium. The moveable ramp comprises a bracket that is configured to releasably engage with the actuator arm. The elevator is configured move the actuator arm in a z direction such that both the actuator arm and the moveable ramp move in the z direction when the bracket of the moveable ramp is engaged with the actuator arm.

In yet another embodiment, a method comprises supporting a load beam carrying a head on a moveable ramp that is positioned proximate to an outer diameter of a data storage medium, physically engaging a bracket of the movable ramp with an actuator arm that is coupled to the load beam, activating an elevator to move the actuator arm and connected moveable ramp in a z direction, and disengaging the bracket of the movable ramp from the actuator arm. The head is capable of interacting with the data storage medium.

Other features and benefits that characterize embodiments of the disclosure will be apparent upon reading the following detailed description and review of the associated drawings.

DETAILED DESCRIPTION OF ILLUSTRATIVE EMBODIMENTS

Figure 1:
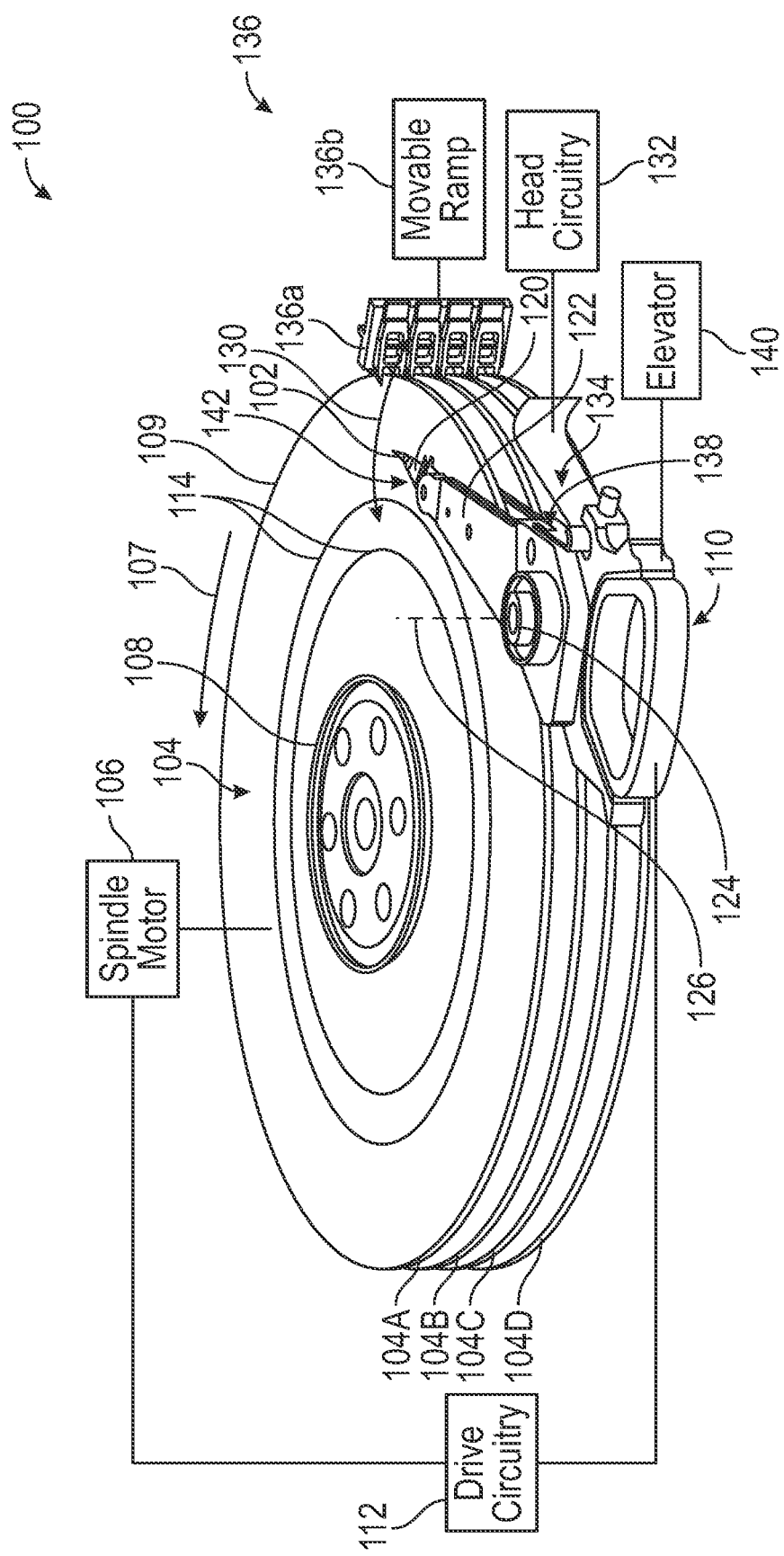
FIG. 1 is a schematic illustration of a data storage device including data storage media, heads for reading data from and/or writing data to the data storage media, and a ramp activation system for an elevator drive.

In general, in order to keep read/write heads from landing on one or more discs in a hard disc drive (HDD) when, for example, power is removed from the HDD, and to prevent the heads from colliding with outer edges of the discs during load and unload operations, a head-support ramp is provided adjacent to an outer diameter (OD) of the disc or discs. In current HDDs, a number of heads is equal to a number of disc surfaces, and the heads are rotated for positioning over their corresponding disc surfaces. There is typically no up/down movement of the heads in such HDDs. However, in an "elevator" drive, for example, the number of heads employed is less than the number of disc surfaces, and a head stack assembly (HSA) including the fewer number of heads is moved up/down to enable a same head to read from multiple disc surfaces. The up/down movement is possible when the HSA is rotated such that the heads are away from the discs and are supported on a ramp. Currently, ramps are a single unit with an edge of the ramp over the OD of the discs. This ramp design prevents up/down movement of the ramp along with the HSA because the edge of the ramp over the OD may collide with the discs during up/down move- To address this above-noted problem, some embodiments of the disclosure employ a split ramp including a stationary or fixed ramp portion adjacent to the OD of the discs and a moveable ramp portion that is adjacent to the stationary ramp. To enable up/down movement of the HSA, the HSA is first rotated away from the discs and away from the stationary ramp (if any), and positioned such that the heads are supported on a moveable ramp portion. Then, the HSA and the moveable portion of the ramp are moved in unison by an elevator in the HDD. In an embodiment, the elevator does not directly move the moveable portion of the ramp;

rather, the movable ramp is temporarily fixed to the actuator arm to move therewith as the elevator directly moves the actuator arm up and down.

In embodiments of the disclosure, an elevator may be operationally directly connected to just to the actuator arm and not directly connected to a moveable ramp. A movable ramp is connected to a vertical guide post and is moveable in a z direction along the vertical guide post. The ramp is selectively engageable to the rotatable actuator arm so that the ramp moves along the vertical guide post in unison with motion of the rotatable actuator arm via the elevator.

In a first embodiment, the moveable ramp engages the actuator arm by insertion of an end portion of a bracket of the movable ramp into a channel between horizontal plates of the actuator arm. An opposite end of the movable ramp includes a linear slider on a linear bearing.

In a second embodiment, the moveable ramp engages the actuator arm by insertion of the actuator arm into a channel or cleft between horizontal fingers of the movable ramp. A portion of the movable ramp includes a cylindrical slider surrounding a cylindrical bearing.

In a third embodiment, a moveable ramp engages the actuator arm by energization of cooperating electromagnetic/ferrous metal portions on the arm and ramp bracket. Distal and intermediate portions of the ramp bracket include cylindrical sliders surrounding respective cylindrical bearings.

In a fourth embodiment, a rotatable moveable ramp engages the actuator arm by insertion of an end of the ramp bracket into a channel between horizontal plates of the actuator arm. An opposite end of the ramp bracket includes a linear slider on a linear bearing. A rotatable portion of the moveable ramp is pivotally mounted to the linear slider.

FIG. 1 shows an illustrative operating environment in which certain embodiments disclosed herein may be incorporated. The operating environment shown in FIG. 1 is for illustration purposes only. Embodiments of the present disclosure are not limited to any particular operating environment such as the operating environment shown in FIG. 1. Embodiments of the present disclosure are illustratively practiced within any number of different types of operating environments.

It should be noted that the same reference numerals (or reference numerals indexed in increments of hundreds such as 148, 248, 348, for example) are used in different figures for the same or similar elements. All descriptions of an element also apply to all other versions of that element unless otherwise stated. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that, when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

FIG. 1 is a schematic illustration of a data storage device 100 including data storage media, heads for reading data from and/or writing data to the data storage media and a split ramp for supporting the heads. In data storage device 100, heads 102 may be positioned over storage media 104 to read data from and/or write data to the data storage media 104. In the embodiment shown in FIG. 1, the data storage media 104 are rotatable data storage discs, with each disc 104 having opposing surfaces that serve as data storage surfaces. For read and write operations, a spindle motor 106 (illustrated schematically) rotates the media 104 as illustrated by arrow 107 and an actuator mechanism 110 positions the heads 102 relative to data tracks 114 on the rotating media 104 between an inner diameter (ID) 108 and an outer diameter (OD) 109. Both the spindle motor 106 and actuator mechanism 110 are connected to and operated through drive circuitry 112 (schematically shown). Each of heads 102 is coupled to the actuator mechanism 110 through a suspension assembly which includes a load beam 120 connected to an actuator arm 122 of the mechanism 110 for example through a swage connection. The actuator mechanism 110 is rotationally coupled to a frame or deck (not shown) through a bearing 124 to rotate about axis 126. Rotation of the actuator mechanism 110 moves the heads 102 in a cross-track direction as illustrated by arrow 130. Each of the heads 102 includes one or more transducer elements (not shown) coupled to head circuitry 132 through flex circuit 134.

In general, in order to keep read/write heads 102 from landing on discs 104 in a data storage device 100 when, for example, power is removed from the data storage device 100, and to prevent the heads 102 from colliding with outer edges of the discs 104 during load and unload operations, a head support ramp assembly 136 is provided adjacent to the OD 109 of the discs 104. In data storage device 100, a number of heads 102 is less than a number of disc 104 surfaces. In the particular embodiment shown in FIG. 1, data storage device 100 includes four discs 104A, 104B, 104C, 104D, with a total of 8 data storage surfaces, and two heads 102. As noted above, each of the two heads 102 is coupled to the actuator mechanism 110 through a suspension assembly which includes a load beam 120 connected to an actuator arm 122. The actuator mechanism 110, the load beams 120 and the actuator arms 122 are collectively referred to as the head stack assembly (HSA) 138.

In data storage device 100 of FIG. 1, the HSA 138 may be moved along axis 126 to different positions under motive of an elevator 140, which is schematically shown in FIG. 1. In an uppermost position shown in FIG. 1, the two heads 102 interact with upper and lower data storage surfaces of disc 104A. In other positions (not shown), which are below the uppermost position, the same two heads interact with data storage surfaces of discs 104B, 104C and 104D.

To enable the up/down movement of the HSA 138, head-support ramp 136 in some embodiments is designed as a split ramp with a stationary portion 136a and moveable portion 136b. In order to move the HSA 138 from either an upper position to a lower position or from a lower position to an upper position, the HSA 138 is first rotated about axis 126 until a head end 142 of the HSA 138 is supported on the moveable portion 136b of the head-support ramp assembly 136. Then, the HSA 138 and the moveable portion 136b are moved in unison along axis 126. In an embodiment, the elevator 140 does not directly move the moveable ramp portion 136b; rather, the movable ramp 136b is temporarily fixed to the actuator arm 122 to move therewith as the elevator 140 directly moves the actuator arm 122 up and down.

Figure 11:
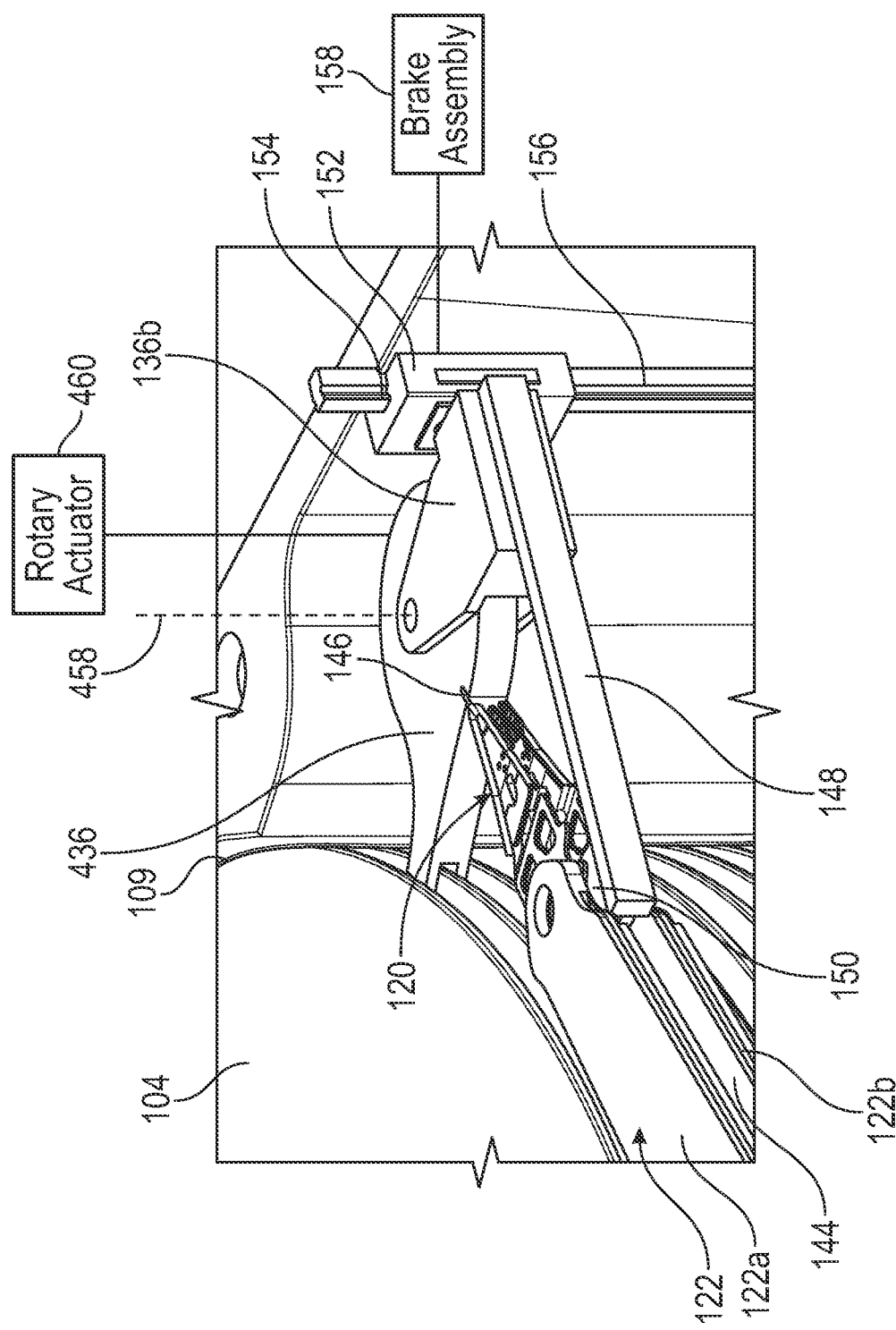
FIG. 11 is a partial perspective view of a data storage device having a fourth exemplary embodiment of a ramp activation system.

In one embodiment, a base of elevator 140 may be driven up and down by a coil and a magnet (not shown) with hard stops at both ends that limit the extent of upward and downward movement of the HSA 138. In general, any suitable driving mechanism may be used to move elevator 140 up and down. Head support ramp assembly 136 supports head end 142 of HSA 138 when the HSA 138 is rotated away from the data storage disc(s) 104. In some embodiments, head support ramp assembly 136 includes a first ramp portion 136a, 436 (of FIGS. 11-12D) adjacent to the OD 109 of the data storage disc(s) 104 and a second ramp portion 136b adjacent to the first ramp portion 136a. In some embodiments, the first ramp portion 436 may be moveable away from the OD 109. In the embodiment of FIGS. 11-12D, which is described further below, first ramp portion 436 is rotatably movable about pivot axis 458.

Figure 2:
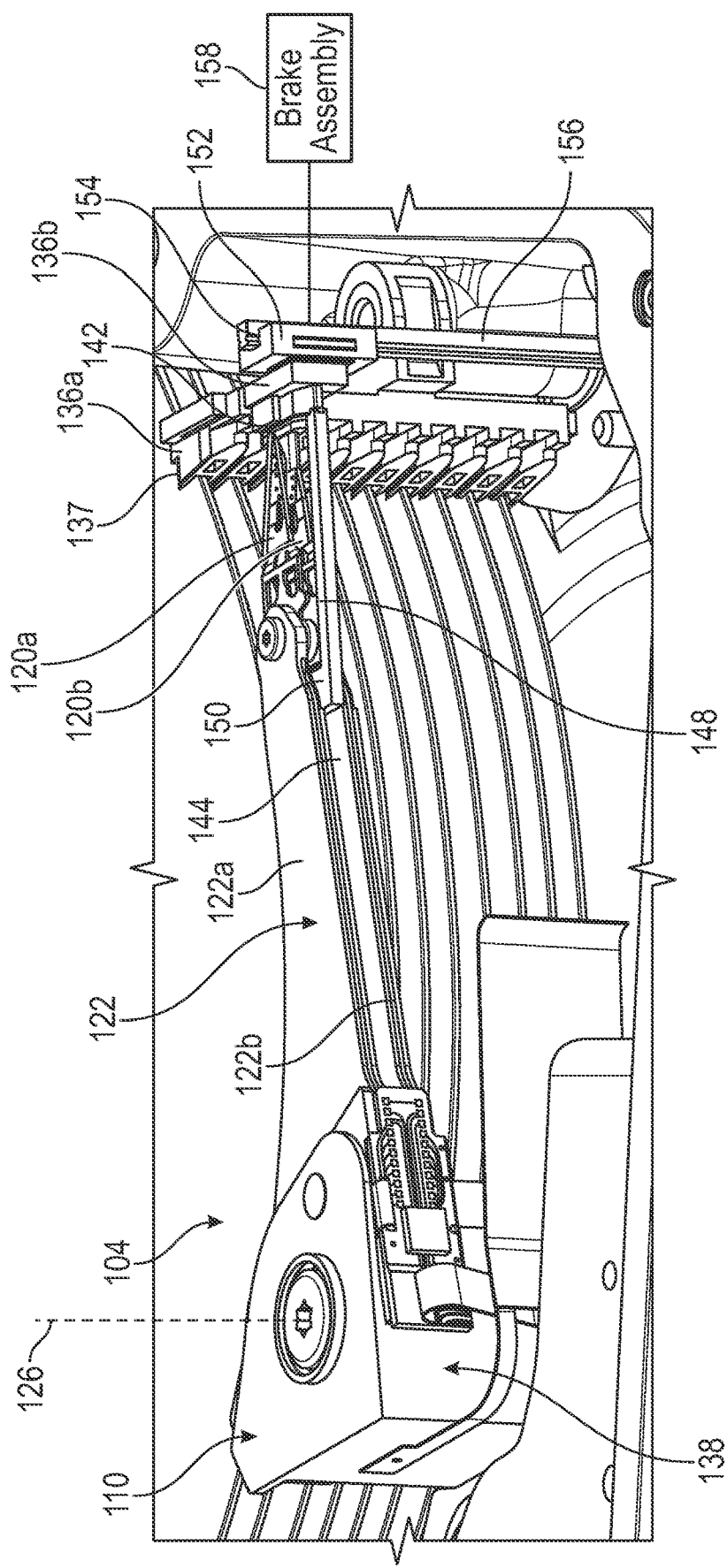
FIG. 2 is a partial perspective view of a data storage device including a first exemplary embodiment of a ramp activation system.
Figure 3:
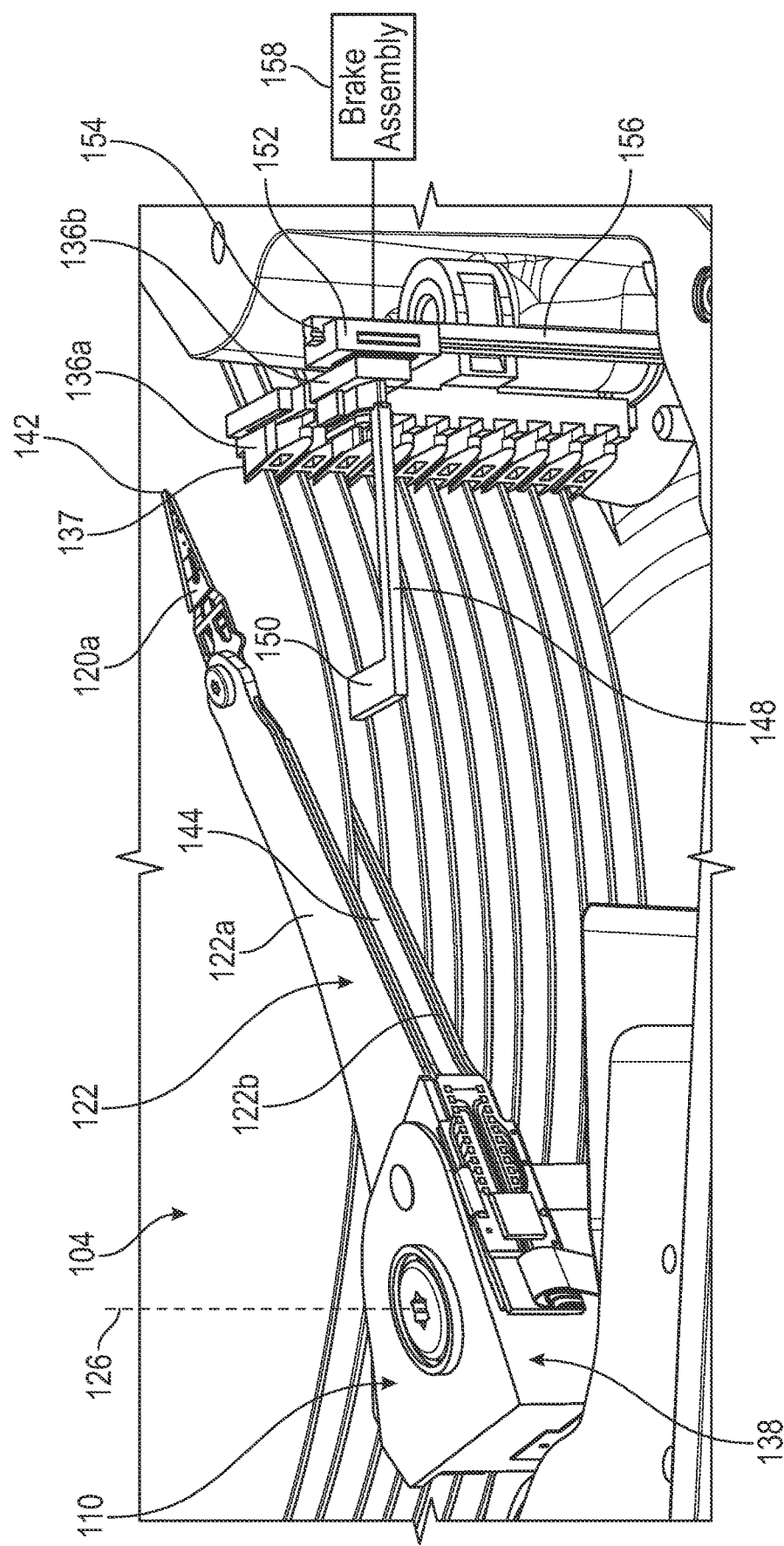
FIG. 3 is similar to FIG. 2 but shows the actuator arm of the data storage device in a read/write position.

As shown in FIGS. 2 and 3, in a first embodiment of a ramp activation system used with an elevator drive, actuator arm 122 includes upper plate 122a and lower plate 122b separated by channel 144. Upper load beam portion 120a and lower load beam portion 120b carry heads 102 for reading and writing on top and bottom surfaces of a disc 104. A lift tab 146 (not shown in FIGS. 2 and 3) extends from the load beam 120 to rest on the head support ramp assembly 136 when the disc drive storage device 100 is in an off or non-operating state. Bracket 148 is attached to moveable ramp 136b and is configured for selective engagement to, and disengagement from, actuator arm 122. In an exemplary embodiment, engagement of moveable ramp 136b to actuator arm 122 is accomplished by insertion of end portion 150 of bracket 148 into channel 144 of actuator arm 122, as shown in FIG. 2. In an exemplary embodiment, disengagement of actuator arm 122 from moveable ramp 136b is accomplished by pivoting actuator arm about axis 126 so that its channel 144 is free from end portion 150 of bracket 148, as shown in FIG. 3. In an exemplary embodiment, moveable ramp 136b includes a linear slider 152 mounted with a linear bearing 154 on vertical guide post 156.

In the illustrated engaged configuration between actuator arm 122 and moveable ramp 136b shown in FIG. 2, as actuator mechanism 110 is activated to raise and lower actuator arm 122 via elevator 140, the moveable ramp 136b, which is connected to actuator arm 122 by bracket 148, moves with the actuator arm 122 up and down along vertical guide post 156. Thus, unified motion of the actuator arm 122 with the head components 102 thereon, as well as the moveable ramp 136b on which the head end 142 rests, is accomplished even though there is no direct connection between the elevator 140 and the moveable ramp 136b.

For use of heads 102 for reading and writing data relative to disc 104, actuator 110 is activated to rotate the actuator arm 122 about axis 126, to thereby move the head end 142 of HSA 136 off of the head support ramp assembly 136 and to the disc 104, as shown in FIG. 3. With bracket 148 thus disengaged from channel 144 of actuator arm 122, brake assembly 158 (shown schematically) is used to maintain moveable ramp 136b in the location last achieved. In the illustrated embodiment, end portion 150 of bracket 148 is located on one end of moveable ramp 136b, and vertical guide post 156 is located on an opposite end of moveable ramp 136b. Bracket 148 also serves as a stop to prevent actuator arm 122 from pivoting about axis 126 too far (in a clockwise direction as illustrated), thereby constraining the motion of head end 142 to suitable locations on movable ramp 136b, stationary ramp 136a, and disc 104.

Figure 4:
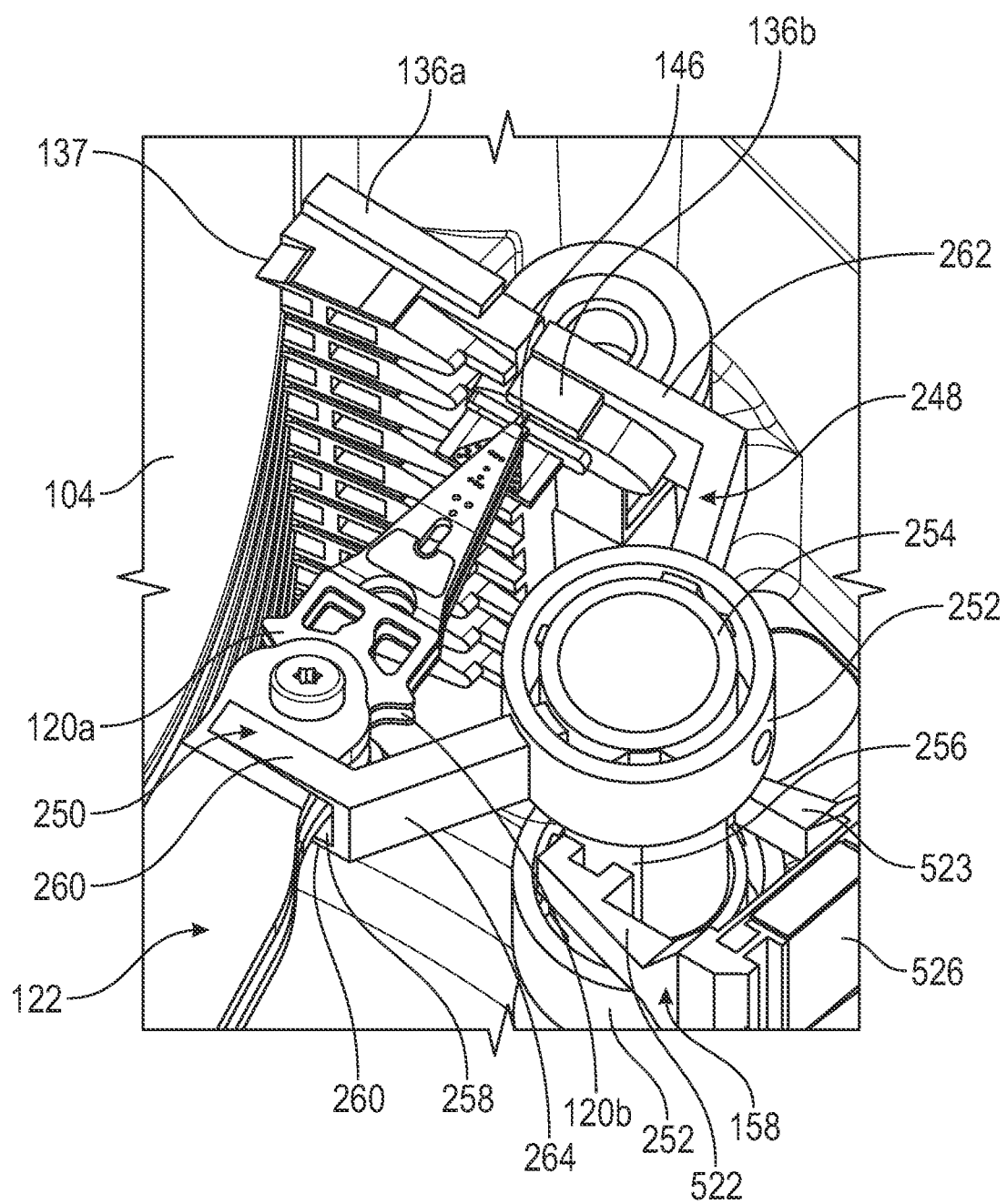
FIG. 4 is a partial perspective view of a data storage device including a second exemplary embodiment of a ramp activation system.
Figure 5:
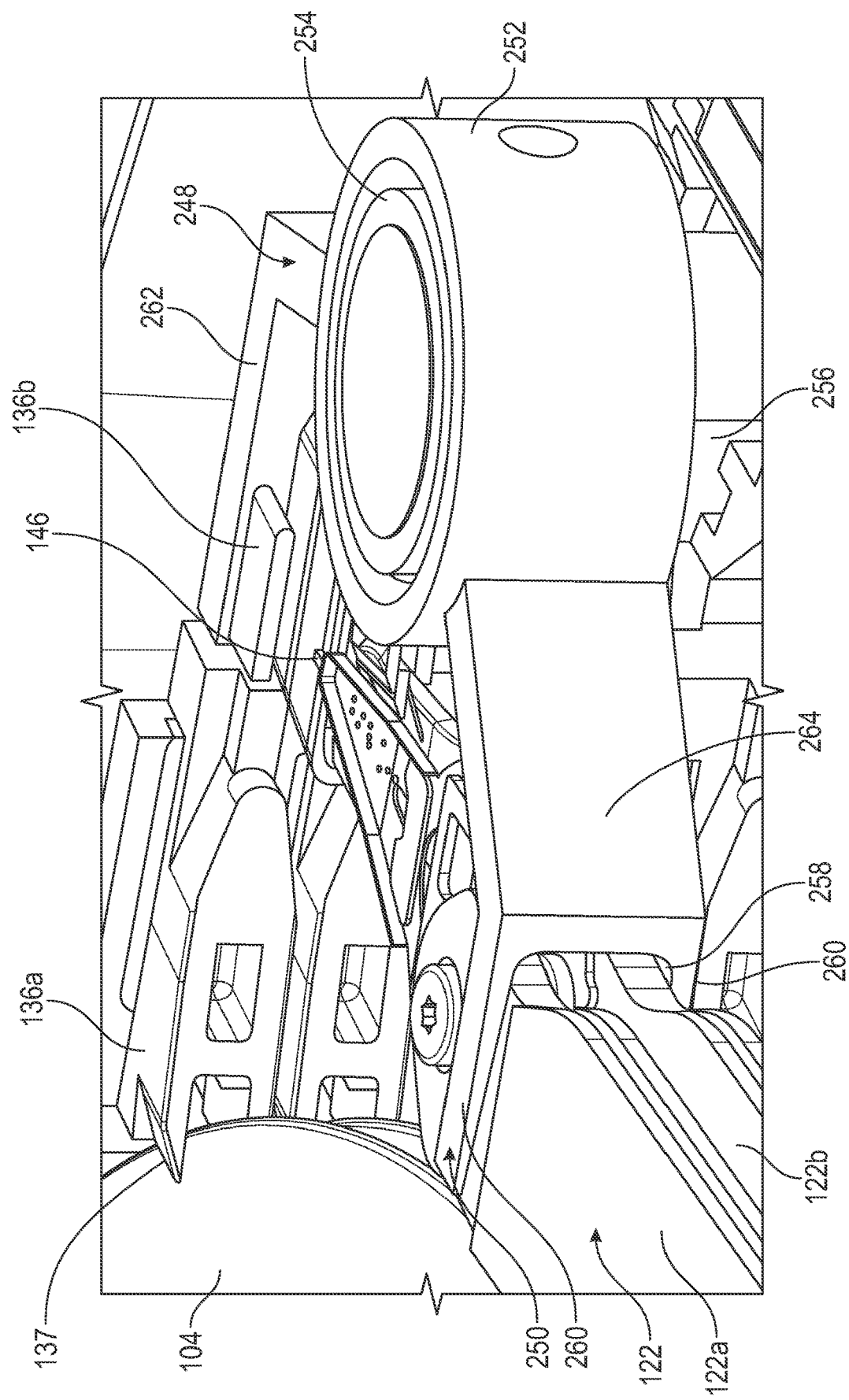
FIG. 5 is a partial perspective view of a data storage device, showing the ramp activation system of FIG. 4 from a different angle.
Figure 6:
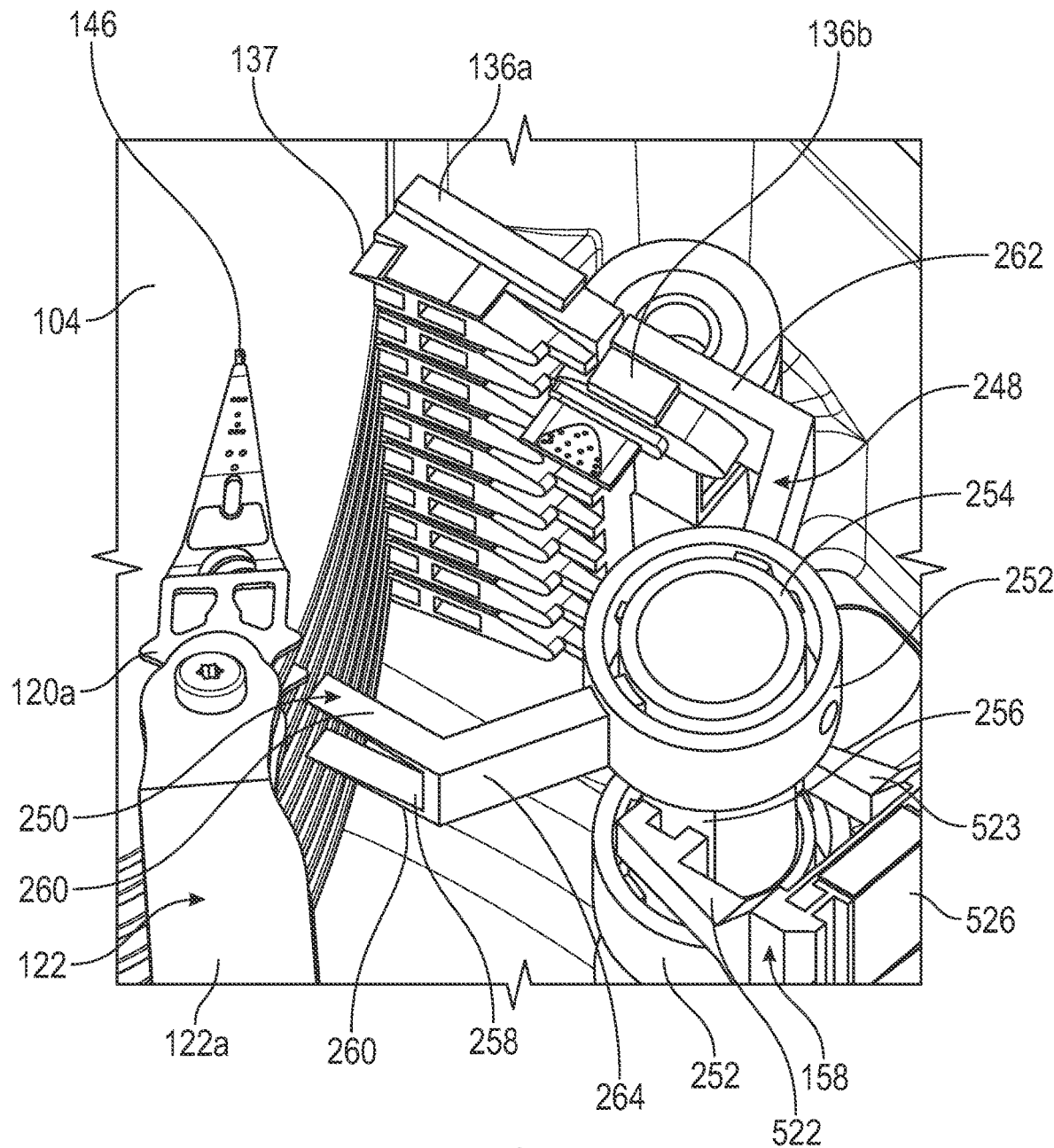
FIG. 6 is similar to FIG. 4 but shows the actuator arm in a read/write position.

FIGS. 4-6 illustrate a second exemplary embodiment of a ramp activation system for data storage device 100. Bracket 248 is attached to moveable ramp 136b and is configured for selective engagement to, and disengagement from, actuator arm 122. In an exemplary embodiment, engagement of moveable ramp 136b to actuator arm 122 is accomplished by insertion of a portion of actuator arm 122 into cleft 258 between fingers 260 of end portion 250 of bracket 248, as shown in FIGS. 4 and 5. In an exemplary embodiment, disengagement of actuator arm 122 from moveable ramp 136b is accomplished by pivoting actuator arm about axis 126 so that it is free from end portion 250 of bracket 248, as shown in FIG. 6. In an exemplary embodiment, moveable ramp 136b having bracket 248 includes cylindrical linear (vertical) sliders 252 mounted with cylindrical bearings 254 on vertical guide post 256.

In the illustrated engaged configuration between actuator arm 122 and moveable ramp 136b shown in FIGS. 4 and 5, as actuator mechanism 110 is activated to raise and lower actuator arm 122 via elevator 140, the moveable ramp 136b, which is connected to actuator arm 122 by bracket 248, moves with the actuator arm 122 up and down along vertical guide post 256. Thus, unified motion of the actuator arm 122 with the head components 102 thereon, as well as the moveable ramp 136b on which the head end 142 rests, is accomplished even though there is no direct connection between the elevator 140 and the moveable ramp 136b.

For use of heads 102 for reading and writing data relative to disc 104, actuator 110 is activated to rotate the actuator arm 122 about axis 126, to thereby move the head end 142 of HSA 136 off of the head support ramp assembly 136 and to the disc 104, as shown in FIG. 6. With bracket 248 thus disengaged from actuator arm 122, brake assembly 158 is used to maintain moveable ramp 136b in the location last achieved. Bracket 248 at cleft 258 also serves as a stop to prevent actuator arm 122 from pivoting about axis 126 too far (in a clockwise direction as illustrated), thereby constraining the motion of head end 142 to suitable locations on movable ramp 136b, stationary ramp 136a, and disc 104.

Bracket 248 is attached to moveable ramp 136b to be moved up and down vertical guide post 256, which includes cylindrical bearings 254, upon cylindrical linear sliders 252. In an exemplary embodiment, end portion 250 of bracket 248 is configured with a cleft 258 between two horizontal fingers 260. Actuator arm 122 engages with bracket 248 by insertion of the upper and lower plate 122a, 122b into cleft 258 between fingers 260.

In the illustrated configuration, vertical guide post 256 is located between end portion 250 and moveable ramp 136b. In an exemplary embodiment, bracket 248 is not substantially straight. Rather, bracket portion 262 proximate moveable ramp 136b and bracket portion 264 proximate end portion 250 meet at non-linear angles around vertical guide post 256. This configuration allows for more space between the load beam 120 and the nearby vertical guide post 256, as shown in the "parked" configuration of FIGS. 4 and 5.

Figure 7:
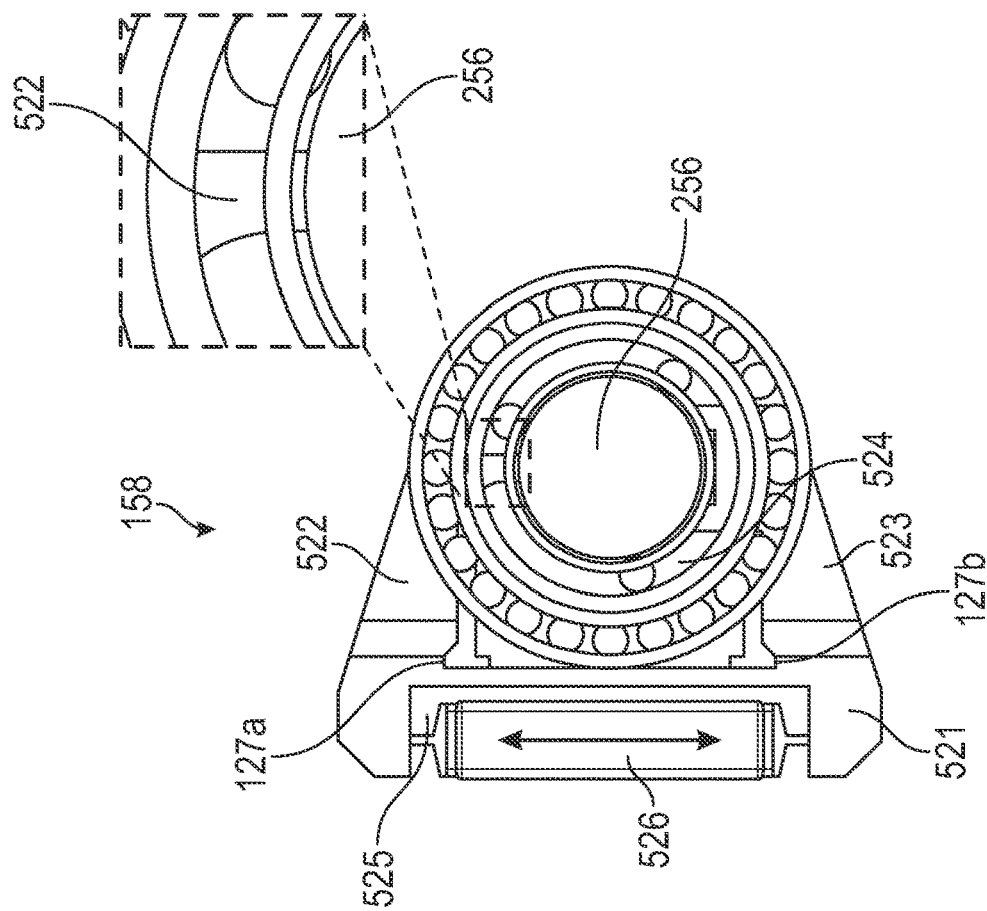
FIG. 7 is a top plane view of a brake assembly suitable for use on a ramp activation system, with the brake deactivated.
Figure 8:
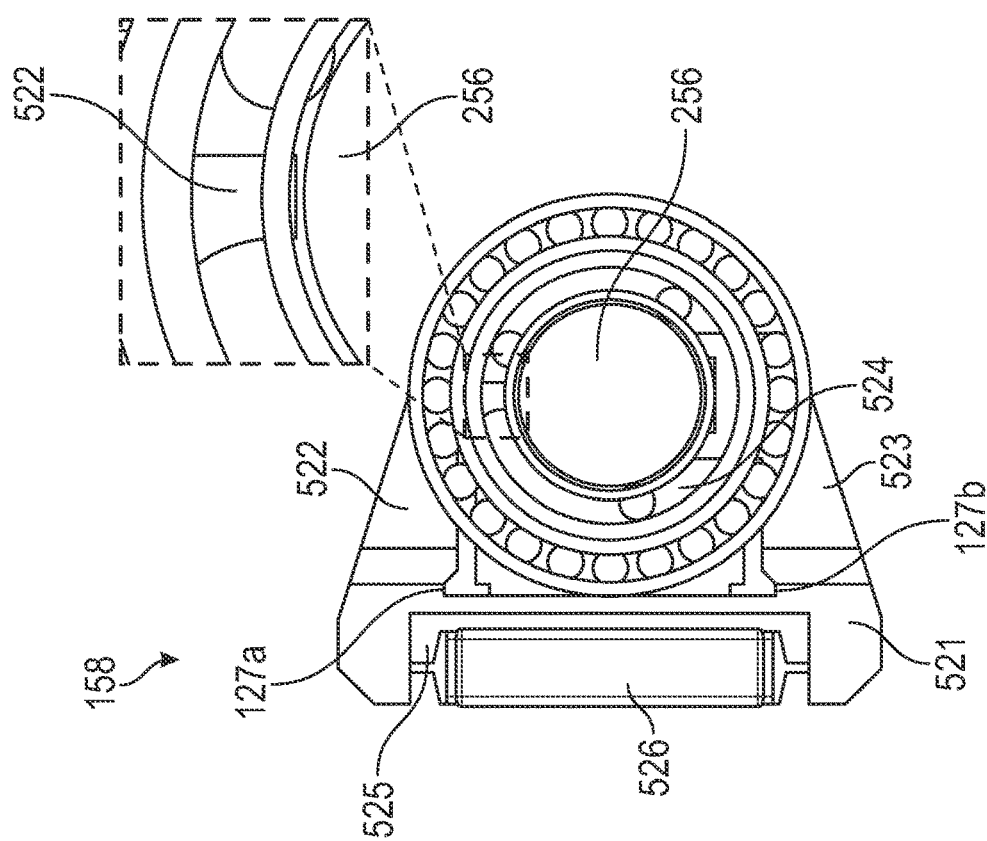
FIG. 8 is a top plane view of the brake assembly of FIG. 7, with the brake activated.

In an exemplary embodiment, as shown in FIGS. 7 and 8, the brake assembly 158 generally includes a first clamp arm 522 generally located at one end of a base portion 521, while the second clamp arm 523 is located at the opposite end of the base portion 521. The first clamp arm 522 and the second clamp arm 523 extend from the base portion 521 in the same direction, such that they define an opening 524 between the first and second clamp arms 522, 523. When the brake assembly 158 is mounted on the vertical guide post 156, 256, 356, the vertical guide post 156, 256, 356 resides within in the opening 524.

The base portion 521 include a recess 525 within which is disposed an actuator element 526 configured to move the arms 522, 523 when activated. Reference herein to an actuator element may include any type of device capable of moving arms 522, 523. For sake of simplicity, the remainder of this Detailed Description will refer to an actuator element as a piezoelectric element, which is one type of suitable actuator element that changes in size when activated to thereby move arms 522, 523. However, it should be appreciated that many other types of actuator elements are also suitable, such as magnetic or shape memory alloys or bimetallics. The piezoelectric element 526 may be sized such that it has approximately the same length as the recesses 525 when in a non-activated state (shown in FIG. 7). In this manner, when the piezoelectric element 526 is activated to expand in size, such as expansion in the length direction shown by the arrow in FIG. 8, the piezoelectric element 526 pushes against the base portion 521 at the ends of the recess 525.

The movement of the piezoelectric element 526 against the ends of the recess 525 as described above allows for the terminal ends of the first and second clamp arms 522, 523 to move closer together. In some embodiments, such movement of the terminal ends of the clamp arms 522, 523 in response to the expansion of the piezoelectric elements is based on the clamp arms 522, 523 being connected with the base portion 521 at flex points or hinges 527a, 527b. When the vertical guide post 156, 256, 356 is disposed in the opening 524, this movement together of terminal ends of clamp arms 522, 523 results in a clamping force being exerted against the vertical guide post 156, 256, 356, as shown in FIG. 8. As discussed in greater detail below, this clamping force allows for the brake assembly 158 to lock in place at any z position along the length of the vertical guide post 156, 256, 356.

In FIG. 7, the piezoelectric element 526 is in a non-activated (e.g., non-expanded) state. The piezoelectric element 526 resides against the base portion 521 at the ends of the recess 525 but does not push against the ends of the recess 525. As shown in the inset of FIG. 7, the terminal end of the clamp arm 522 is spaced apart from the vertical guide post 156, 256, 356 so as to not physically contact the vertical guide post 156, 256, 356. The overall dimensions of the clamp arms 522, 523 are designed such that the terminal ends of the first clamp arm 522 and the second clamp arm 523 do not push, contact or reside against the vertical guide post 156, 256, 356 when the vertical guide post 156, 256, 356 is disposed in the opening 524 and the piezoelectric element 526 is not activated. The clamp arms 522, 523 are connected to the base portion 521 via flex points 527a, 527b. The clamp arms 522, 523 are capable of bending/pivoting at the flex points 527a, 527b without breaking off from the base portion 521. The flex points 527a, 527b may be designed such that when no force is applied to the clamp arms 522, 523, they remain in the state shown in FIG. 7, e.g., not touching or pushing against vertical guide post 156, 256, 356. The flex points 527a, 527b can therefore be considered to be biased towards the state shown in FIG. 7.

FIG. 8 illustrates how the clamp arms 522, 523 move when piezoelectric element 526 is activated and expands. More specifically, when the piezoelectric element 526 expands, it pushes against the base portion 521 at the ends of the recess 525. This outward movement of the base portion 521 causes the arms 522, 523 to effectively pivot inwardly at the flex points 527a, 527b, such that the terminal ends of the arms 522, 523 come closer together and push against the vertical guide post 156, 256, 356, as shown in the inset of FIG. 8. So long as the piezoelectric element 526 is activated, the arms 522, 523 remain pivoted inwardly and continue to exert clamping force on the vertical guide post 156, 256, 356. When the brake assembly 158 is stationary, this clamping force allows the brake assembly 158 to maintain an associated bracket 148, 248, 348 at a desired z position along a respective vertical guide post 156, 256, 356. When the piezoelectric element 526 is deactivated, causing it to reduce in size and no longer push outwardly on the base portion 521, the bias of the flex points 527a, 527b results in the arms reverting back to the position shown in FIG. 7, thereby removing the clamping force from the vertical guide post 156, 256, 356. Thus, the brake assembly 158, which is fixed to bracket 148, 248, 348, is free to move up and down the vertical guide post 156, 256, 356 as the elevator 140 moves an actuator arm 122 that is physically engaged with the bracket 148, 248, 348.

While FIGS. 7 and 8 illustrate an embodiment where the brake assembly 158 includes flex points 527a, 527b for purposes of allowing the terminal ends of the clamp arms 522, 523 to move together and exert a clamping force against the vertical guide post 156, 256, 356, it should be appreciated that other mechanisms for clamp arm movement to exert clamping force can also be used, such as springs, for example. In such an embodiment, the arms may move towards and away from the base portion, parallel to each other, without pivoting. In an embodiment where springs are used, the set of clamp arms may be designed and dimensioned such that the clamp arms exert a clamping force against the vertical guide post when the piezoelectric element is deactivated. When the piezoelectric element is activated, it expands in a similar fashion to the expansion described above with respect to FIG. 8. However, in this embodiment, the expansion of the piezoelectric element pushes the clamp arms away from the base portion. As the clamp arms are pushed away from the base portion, the terminal ends of the clamp arms disengage from the vertical guide post and thereby remove the clamping force from the vertical guide post. When the piezoelectric element is deactivated such that it reduces in size, the arms are pulled back towards the base portion via the springs. The springs recoil sufficiently to bring the clamp arms back towards the base portion and reapply clamping force to the vertical guide post.

FIGS. 7 and 8 generally illustrate an embodiment of the pair of clamp arms in which one piezoelectric element per pair of clamp arms is used. However, it should be appreciated that more than one piezoelectric element per pair of clamp arms can also be used in order to increase the range and type of clamp possible. Furthermore, when multiple piezoelectric arms are incorporated into a pair of clamp arms, the multiple piezoelectric elements may be identical in terms of their rate and type of expansion, or may be different types of piezoelectric elements such that each piezoelectric element provides a different type or degree of movement. Similarly, while FIGS. 7 and 8 generally show pairs of clamp arms that include two arms per pair of clamp arm and wherein each clamp arm is essentially an identical mirror of the opposing arm, it should be appreciated that each pair of clamp arms may include more or fewer than two arms, and that all arms need not be identical.

Figure 9:
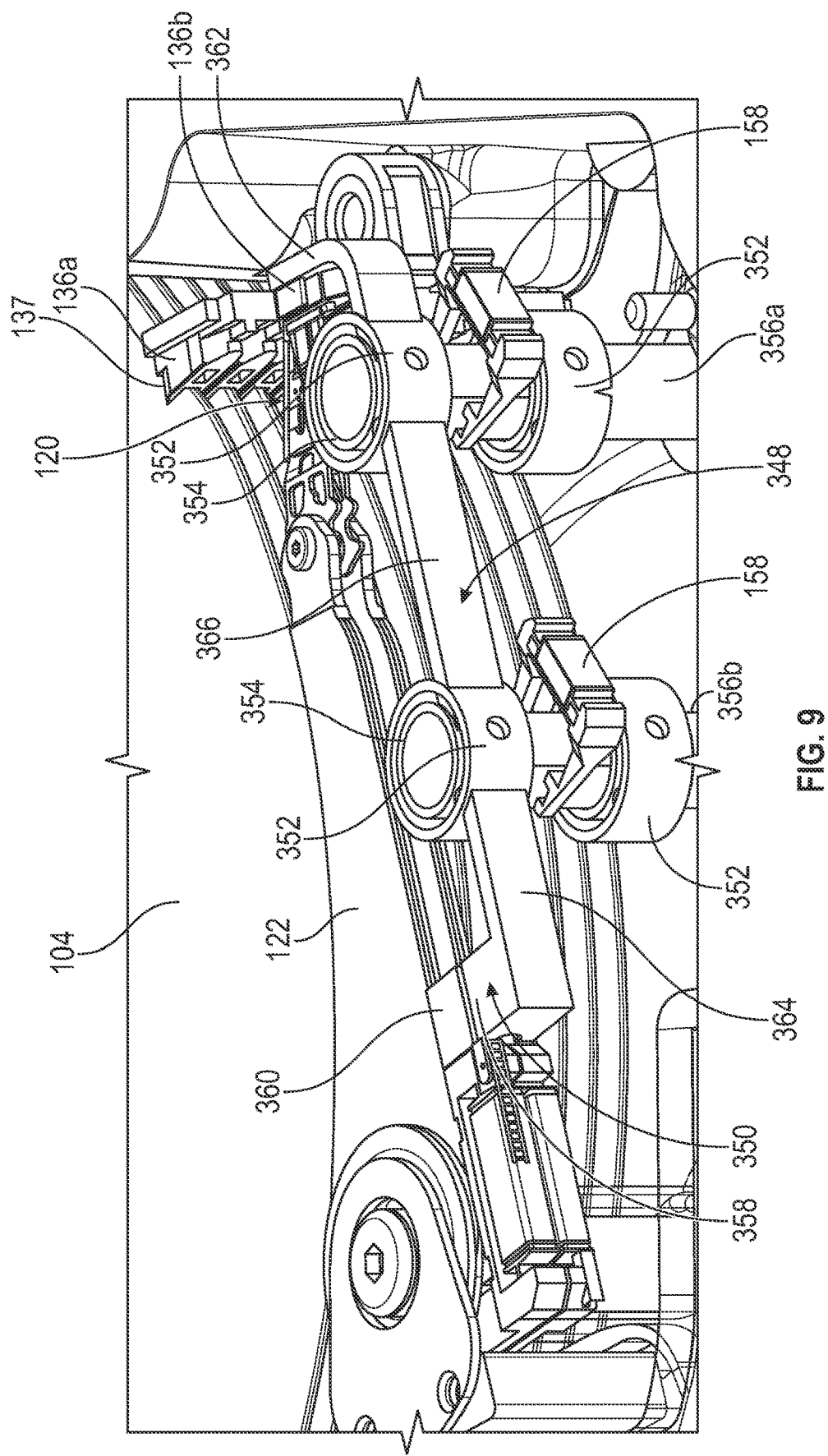
FIG. 9 is a partial perspective view of a data storage device including a third exemplary embodiment of a ramp activation system.
Figure 10:
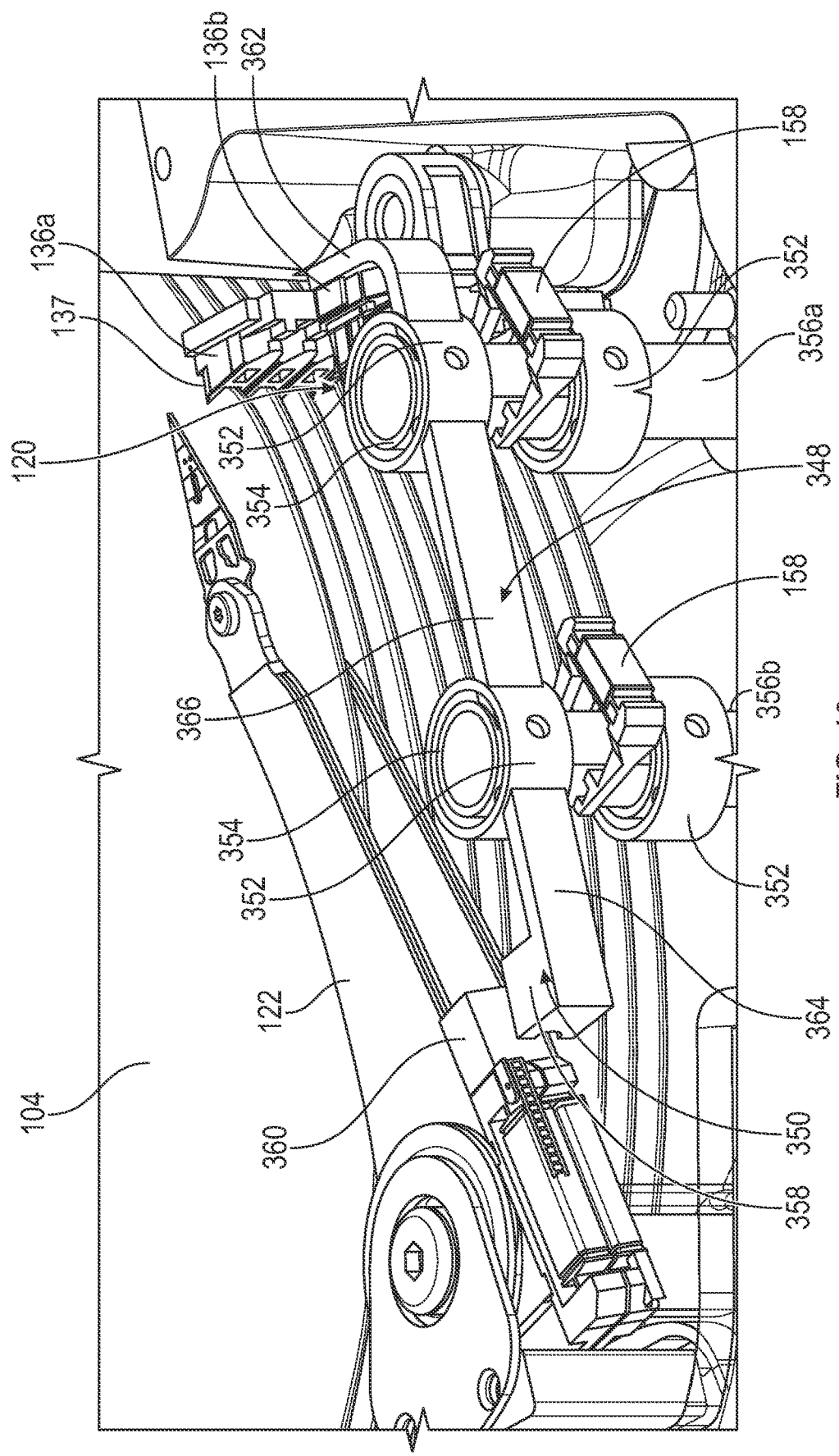
FIG. 10 is similar to FIG. 9 but shows the actuator arm in a read/write position.

FIGS. 9 and 10 illustrate a third exemplary embodiment of a ramp activation system for data storage device 100. The moveable ramp 136b is attached to a bracket 348. End portion 350 of bracket 348 includes a ferrous metal portion 358 that is configured to be selectively attracted to an electromagnetic portion 360 fixed to actuator arm 122. To physically engage moveable ramp 136b to actuator arm 122 with bracket 348, the electromagnetic portion 360 is energized by electrical current to facilitate it attraction to portion 358 of end portion 350, as shown in FIG. 9. Portion 358 is suitably formed of a ferrous metal or another material that is attracted to a magnet. When the current is turned off, the ferrous metal and electromagnetic portions 358, 360 do not attract each other and actuator arm 122 is free to move independently of bracket 348, as shown in FIG. 10. In an embodiment, portion 358 is a magnet or an electromagnet. To disengage the portions 358, 360, the polarity of one of the electromagnets can be reversed to separate the portions 358, 360, thereby separating the bracket 348 and moveable ramp 136b from the HSA 138. In the illustrated embodiment, two vertical guide posts 356a and 356b are used to provide additional structural support for bracket 348. In the illustrated embodiment, an intermediate portion 366 of the bracket 348 is disposed between the portion 362 near moveable ramp 136b and portion 364 near end portion 350.

In an exemplary embodiment, moveable ramp 136b having bracket 348 includes linear (vertical) cylindrical sliders 352 mounted with cylindrical bearings 354 on each of vertical guide posts 356a, 356b. In the illustrated engaged configuration between actuator arm 122 and moveable ramp 136b shown in FIG. 9, as actuator mechanism 110 is activated to raise and lower actuator arm 122 via elevator 140, the moveable ramp 136b, which is connected to actuator arm 122 by bracket 348, moves with the actuator arm 122 up and down along vertical guide posts 356a, 356b. Thus, unified motion of the actuator arm 122 with the head components 102 thereon, as well as the moveable ramp 136b on which the head end 142 rests, is accomplished even though there is no direct connection between the elevator 140 and the moveable ramp 136b.

For use of heads 102 for reading and writing data relative to disc 104, actuator 110 is activated to rotate the actuator arm 122 about axis 126, to thereby move the head end 142 of HSA 136 off of the head support ramp assembly 136 and to the disc 104, as shown in FIG. 10. With bracket 348 thus disengaged from actuator arm 122, brake assembly 158 is used to maintain moveable ramp 136b in the location last achieved. Bracket 348 at ferrous metal portion 358 also serves as a stop to prevent actuator arm 122 from pivoting about axis 126 too far, thereby constraining the motion of head end 142 to suitable locations on movable ramp 136b, stationary ramp 136a, and disc 104.

FIGS. 11-12D illustrate a fourth exemplary embodiment of a ramp activation system for data storage device 100. Moveable ramp 136b includes a rotatable portion 436 that pivots about axis 458 to move out of the way of the outer diameter 109 of disc 104. Accordingly, in this fourth embodiment, no stationary ramp is used. A rotary actuator 460 (shown schematically) is used to rotate the moveable ramp 436 about the axis 458. Such an actuator 460 can be of various types, including shape memory alloy (SMA), motor, solenoid, and bi-metallic types. Axis 458 is substantially parallel to axis 126.

The rotary ramp system can also use a pancake motor to move the moveable ramp 436 in the z direction as well as to rotate it about the axis 458. The change in operation between linear z direction motion and rotary motion can be achieved using a clutch system, brake system, or physical stops (not shown). Feedback for alignment can be achieved optically or using other sensor technology.

Upper load beam portion 120a and lower load beam portion 120b carry heads 102 for reading and writing on top and bottom surfaces of a disc 104. A lift tab 146 extends from the load beam 120 to rest on the rotatable portion 436 of movable ramp 136b when the disc drive storage device 100 is in an off or non-operating state. Bracket 148 is attached to moveable ramp 136b and is configured for selective engagement to, and disengagement from, actuator arm 122. In an exemplary embodiment, engagement of moveable ramp 136b to actuator arm 122 is accomplished by insertion of end portion 150 of bracket 148 into channel 144 of actuator arm 122, as shown in FIG. 11. In an exemplary embodiment, disengagement of actuator arm 122 from moveable ramp 136b is accomplished by pivoting actuator arm about axis 126 so that its channel 144 is free from end portion 150 of bracket 148, as shown in FIGS. 12C and 12D. In an exemplary embodiment, moveable ramp 136b includes a linear slider 152 mounted with a linear bearing 154 on vertical guide post 156.

Figure 12A:
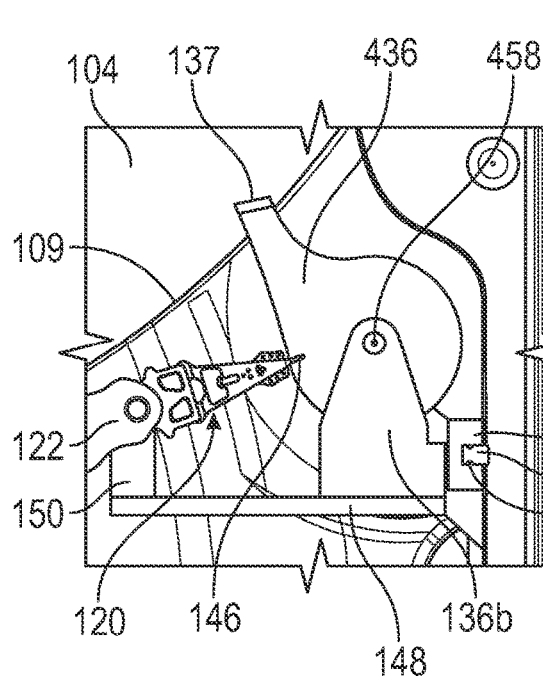
FIG. 12A is a top plane view of a portion of the data storage device of FIG. 11.
Figure 12B:
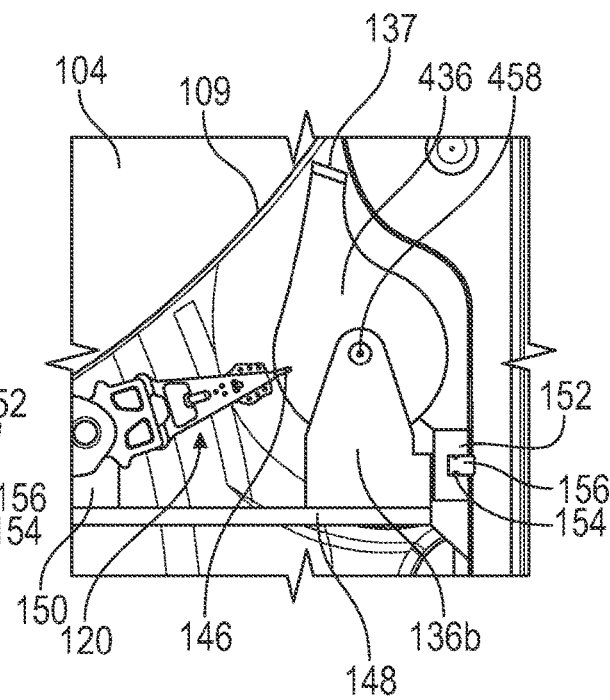
FIG. 12B is a top plane view of a portion of the data storage device of FIG. 11, with the movable ramp portion pivoted about its axis compared to the configuration of FIG. 12A.
Figure 12C:
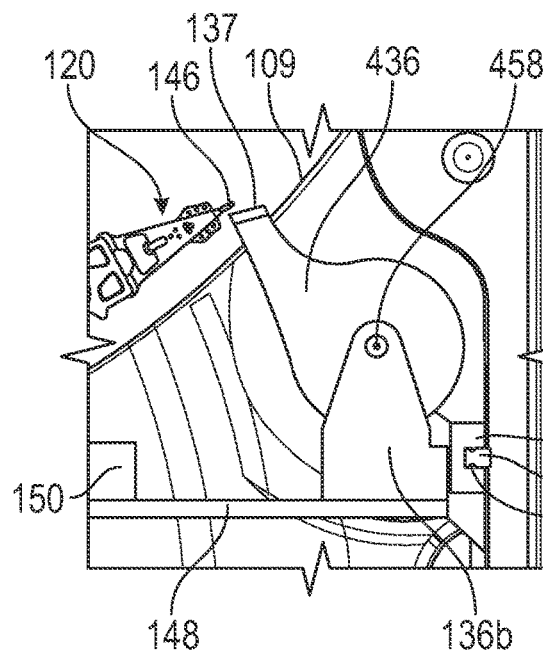
FIG. 12C is a top plane view of a portion of the data storage device of FIG. 11, with the actuator arm in a read/write position.
Figure 12D:
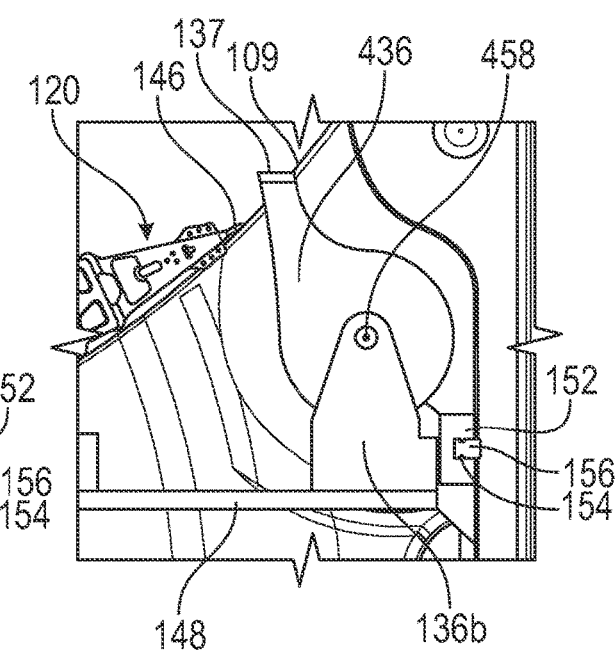
FIG. 12D is a top plane view of a portion of the data storage device of FIG. 11, with the movable ramp portion pivoted about its axis to allow the actuator arm to assume a read/write position at an extreme outer diameter of the disc.

In the illustrated engaged configuration between actuator arm 122 and moveable ramp 136b shown in FIGS. 11, 12A and 12B, as actuator mechanism 110 is activated to raise and lower actuator arm 122 via elevator 140, the moveable ramp 136b, which is connected to actuator arm 122 by bracket 148, moves with the actuator arm 122 up and down along vertical guide post 156. Thus, unified motion of the actuator arm 122 with the head components 102 thereon, as well as the moveable ramp 136b on which the head end 142 rests, is accomplished even though there is no direct connection between the elevator 140 and the moveable ramp 136b.

For use of heads 102 for reading and writing data relative to disc 104, actuator 110 is activated to rotate the actuator arm 122 about axis 126, to thereby move the head end 142 of HSA 136 off of the rotatable portion 436 and to the disc 104, as shown in FIGS. 12C and 12D. With bracket 148 thus disengaged from channel 144 of actuator arm 122, brake assembly 158 (shown schematically) is used to maintain moveable ramp 136b in the location last achieved. In the illustrated embodiment, end portion 150 of bracket 148 is located on one side of moveable ramp 136b, and vertical guide post 156 is located on an opposite side of moveable ramp 136b. Bracket 148 also serves as a stop to prevent actuator arm 122 from pivoting about axis 126 too far, thereby constraining the motion of head end 142 to suitable locations on movable ramp 136b and disc 104.

FIG. 12A shows head 120 resting on the rotatable portion 436 of movable ramp 136b. By pivoting actuator arm 122 about axis 126, the transducer head 102 can be moved in the cross-track direction 130 so that the load beam 120 slides off the rotatable portion 436 of the moveable ramp 136b, past edge 137, and to discs 104, as shown in FIG. 12C.

As shown in FIG. 12D, to enable access of the head 102 to an extreme outer diameter track close to OD 109, the rotatable portion 436 is moved by the rotary actuator 460 in a clockwise motion to thereby allow additional clearance of head 102 very close to OD 109.

During normal use/operation of data storage device 100, the first ramp portion 136a, 436 is positioned with its edge 137 over the OD 109 as shown in FIGS. 1-6, 9-12A, 12C and 12D. This enables head end 142 of HSA 138 to move in cross-track direction 130 (as actuator arm 122 pivots about axis 126) to move between a read/write position at disc 104 and a parked position on head support ramp assembly 136. However, when first ramp portion 136a, 436 is positioned with its edge over the OD 109, one or more of discs 104 cannot be easily replaced. Thus, as shown in FIG. 12B, to enable replacement of one or more discs 104, first ramp portion 436 may be rotated about pivot axis 458 to clear the edge ramp 137 from the OD 109. It should be noted that if the actuator arm 122 or any portion thereof is over/under disc 104, the HSA 138 is also rotated about axis 126 until head end 142 of the HSA 138 is supported on the ramp portion 136b, 436. A maximum limit of rotation of the HSA 138 away from the disc(s) 104 may be set by providing a suitable obstruction, such as bracket 148, 248, 348, for example.

With head end 142 of the HSA 138 supported on the ramp portion 436, and with the ramp portion 436 in the rotated position shown in FIG. 12B, one or more discs 104 may be easily lifted from the spindle and replaced. Such an embodiment enables the replacement and addition of one or more discs 104 without disassembling the HSA 138. Another position in which the ramp portion 436 is off discs 104 can be accomplished by rotating ramp portion 436 even farther counter-clockwise to pass edge 137 over the disc and off again to the left. This is useful when using a hard stop method and the actuation system is used for rotation, especially when it is a motor. Since there is a hard stop on both sides, the rotatable ramp portion 436 can be rotated using the actuator/motor and still have it move up and down as in a screw system.

Although the above disclosure regarding FIGS. 11-12D primarily describes a head-support actuator as rotary actuator 460, linear actuators may instead be used in some embodiments. In some embodiments, a split ramp (having a separate first portion 136a and second portion 136b, 436) may be employed in "jukebox" data storage device where a portion of the split ramp may be retracted/rotated to mount any of a plurality of selectable discs onto the spindle. After the disc is suitably mounted, the split ramp can be moved back to its non-retracted/non-rotated original position to ready the device for read/write operations.

Figure 13:
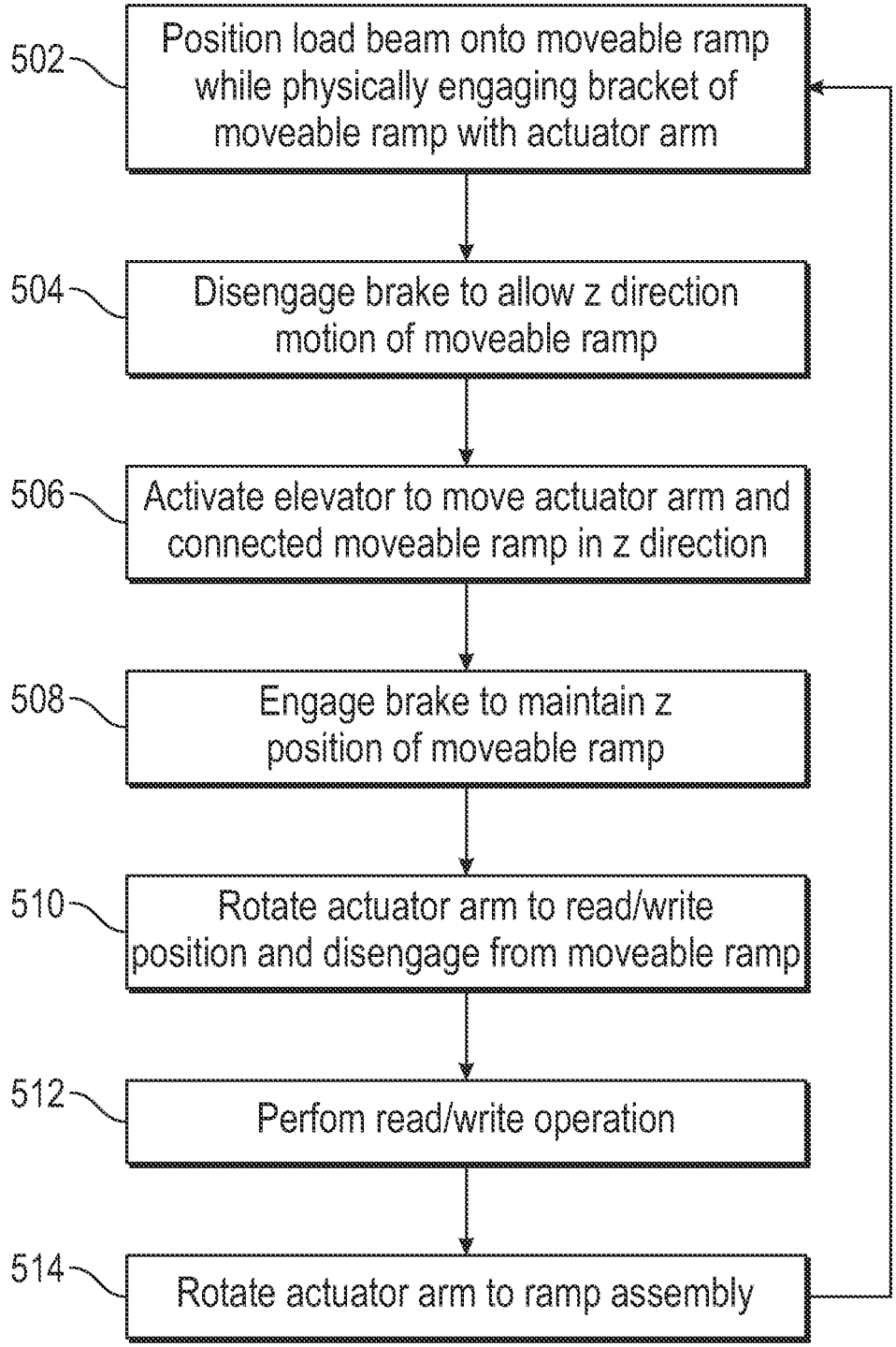
FIG. 13 illustrates steps in a method for using a ramp activation system.

FIG. 13 is a simplified flow diagram of a method 500 of using a ramp activation system in accordance with one embodiment. The method may be carried out in devices of the type described above in connection with FIGS. 1-12D. The method includes, at 502, moving actuator arm 122 to place a load beam 120 of the actuator arm 122 onto a movable ramp 136b, 436 while physically engaging the actuator arm 122 with bracket 148, 248, 348 of movable ramp 136b. At 504, brake assembly 158 is disengaged. At 506, elevator 140 of actuator mechanism 110 is activated to move actuator arm 120 to in a z direction to a desired location relative to the disc stack, thereby also moving the moveable ramp 136b that is physically engaged to the actuator arm 122. At 508, brake assembly 158 is engaged to retain moveable ramp 136b, 436 in the z position before and during disengagement of actuator arm 122 from bracket 148, 248, 348. At 510, actuator mechanism 110 is activated to rotate actuator arm 122 about axis 126, thereby moving load beam 120 from moveable ramp 136b, 436 and into a read/write position with respect to discs 104. At 512, a read/write operation is performed by head 102 of load beam 120 on disc 104. At 514, after the read/write operation is complete, actuator mechanism 110 is activated to rotate actuator arm 122 about pivot axis 126 to move the load beam 120 in the cross-track direction 130, in order to move the load beam 120 off the disc 104. To read/write relative to another disc 104, the method can return to step 504, wherein the load beam 120 is positioned to rest on ramp assembly 136 and the actuator arm 122 is again physically engaged with bracket 148, 248, 348 of moveable ramp 136b, 436.

The illustrations of the embodiments described herein are intended to provide a general understanding of the structure of the various embodiments. The illustrations are not intended to serve as a complete description of all of the elements and features of apparatus and systems that utilize the structures or methods described herein. Features described with respect to any embodiment also apply to any other embodiment. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A data storage device comprising:
   at least one data storage disc;
   at least one head supported by a rotatable actuator arm, the at least one head configured to communicate with the at least one data storage disc when positioned over the at least one data storage disc;
   an elevator configured to move the rotatable actuator arm in a z direction;
   a first vertical guide post;

a ramp assembly configured to support the at least one head on a movable ramp when the at least one head is rotated away from the at least one data storage disc, the movable ramp being moveable in a z direction parallel to the first vertical guide post; and a bracket attached to the movable ramp, the bracket is attachable to the rotatable actuator arm when the at least one head is rotated away from the at least one data storage disc, so that z direction motion of the rotatable actuator arm via the elevator results in unified z direction motion of the attached movable ramp, and the bracket is disengageable from the rotatable actuator arm when the at least one head is rotated to the at least one data storage disc.

2. The data storage device of claim 1, wherein the bracket comprises a first end that is:

selectively engageable to the rotatable actuator arm; and
disengageable from the rotatable actuator arm.

3. The data storage device of claim 2, wherein:

the actuator arm comprises an upper plate and a lower plate defining a channel between the upper plate and the lower plate; and
the first end of the bracket is configured for selective insertion into the channel and removal from the channel.

4. The data storage device of claim 2 and further comprising a bearing disposed between the movable ramp and the first vertical guide post.

5. The data storage device of claim 1 and further comprising a brake disposed on the first vertical guide post and operable to maintain a z direction position of the movable ramp relative to the first vertical guide post.

6. The data storage device of claim 2, wherein:

the first end of the bracket comprises first and second fingers defining a cleft between the first and second fingers; and
the actuator arm is configured for selective insertion into the cleft and removal from the cleft.

7. The data storage device of claim 2, wherein the movable ramp is positioned between the first end of the bracket and the first vertical guide post.

8. The data storage device of claim 2, wherein the first vertical guide post is positioned between the first end of the bracket and the movable ramp.

9. The data storage device of claim 8, wherein the bracket comprises:

a first bracket portion between the first vertical guide post and the movable ramp; and
a second bracket portion between the first vertical guide post and the first end of the bracket;
wherein the first bracket portion and the second bracket are not linearly aligned.

10. The data storage device of claim 2 and further comprising a second vertical guide post, wherein:

the movable ramp is moveable in a z direction parallel to the second vertical guide post; and
the bracket is engageable to the rotatable actuator arm so that the bracket moves along the first and second vertical guide posts in unison with z direction motion of the rotatable actuator arm via the elevator.

11. The data storage device of claim 10, wherein the bracket comprises:

a first bracket portion between the first vertical guide post and the movable ramp;
a second bracket portion between the second vertical guide post and the first end of the bracket; and
a third bracket portion between the first and second vertical guide posts.

12. The data storage device of claim 2, wherein:

the first end of the bracket comprises a first electromagnetic portion or ferrous metal portion; and
the actuator arm comprises a second electromagnetic portion that is configured for selective activation for magnetic attraction to the first electromagnetic portion or ferrous metal portion.

13. The data storage device of claim 1, wherein the movable ramp is rotatable about a pivot axis.

14. The data storage device of claim 13, wherein the movable ramp has a ramp edge that is movable between a first position over the disc and at least a second position outside an outer diameter of the disc by rotation of the movable ramp about the pivot axis.

15. A data storage device comprising:

at least one data storage medium having an outer diameter (OD);
an actuator arm coupled to a load beam, the load beam carrying a head that is configured to interact with the at least one data storage medium;
a moveable ramp positioned proximate to the OD, the moveable ramp configured to support the head when the head is rotated away from the at least one data storage medium, the moveable ramp comprising a bracket that is configured to releasably engage with the actuator arm; and
an elevator configured to move the actuator arm in a z direction such that both the actuator arm and the moveable ramp move in the z direction when the bracket of the moveable ramp is engaged with the actuator arm.

16. The data storage device of claim 15, wherein the moveable ramp is a part of a ramp assembly that further comprises a fixed ramp positioned between the moveable ramp and the OD.

17. The data storage device of claim 15, wherein the moveable ramp is rotatable about a pivot axis.

18. A method comprising:

supporting a load beam carrying a head, which is capable of interacting with at least one data storage medium, on a moveable ramp that is positioned proximate to an outer diameter of the at least one data storage medium;
physically engaging a bracket of the movable ramp with an actuator arm, which is coupled to the load beam;
activating an elevator to move the actuator arm and connected moveable ramp in a z direction; and
disengaging the bracket of the movable ramp from the actuator arm.

19. The method of claim 18 and further comprising engaging a brake to maintain a z position of the movable ramp independent of the actuator arm.

20. The method of claim 19 and further comprising disengaging the brake.

* * * * *